(12) United States Patent
Breeden et al.

(10) Patent No.: US 9,051,960 B2
(45) Date of Patent: Jun. 9, 2015

(54) HOOK ASSEMBLY

(71) Applicant: Smartstraps LLC, Cleveland, OH (US)

(72) Inventors: Winston Breeden, Chagrin Falls, OH (US); Thaddeus T Brej, Rocky River, OH (US); Douglas Edward Whitner, Chagrin Falls, OH (US); Curtis Patrick Taylor, Chagrin Falls, OH (US)

(73) Assignee: Winston Products LLC, Cleveland, OH (US)

( * ) Notice: Subject to any disclaimer, the term of this patent is extended or adjusted under 35 U.S.C. 154(b) by 158 days.

(21) Appl. No.: 13/833,846

(22) Filed: Mar. 15, 2013

(65) Prior Publication Data

US 2014/0259550 A1    Sep. 18, 2014

(51) Int. Cl.
| | | |
|---|---|---|
| *F16B 45/00* | (2006.01) | |
| *B65B 13/02* | (2006.01) | |
| *B65D 63/16* | (2006.01) | |

(52) U.S. Cl.
CPC .............. *F16B 45/00* (2013.01); *Y10T 24/318* (2015.01); *Y10T 24/4755* (2015.01); *B65B 13/02* (2013.01); *B65D 63/16* (2013.01)

(58) Field of Classification Search
CPC ........ B60P 7/0823; B60P 7/0807; B62J 7/08; F16B 45/00; A63B 21/0552; F16G 11/14; F16G 11/143
USPC ........................................ 24/301, 302, 265 H
See application file for complete search history.

(56) References Cited

U.S. PATENT DOCUMENTS

| | | | | |
|---|---|---|---|---|
| 3,520,033 | A | * | 7/1970 | Usuda .......................... 24/590.1 |
| 4,569,106 | A | * | 2/1986 | Lovato ............................ 24/615 |
| 4,621,393 | A | * | 11/1986 | Ambal ............................. 24/171 |
| 4,779,315 | A | * | 10/1988 | Kohus ......................... 24/587.12 |
| 5,203,058 | A | * | 4/1993 | Krauss ........................ 24/587.12 |
| 5,224,247 | A | * | 7/1993 | Collier ........................ 24/587.12 |
| 5,735,024 | A | * | 4/1998 | Ortiz ........................... 24/573.11 |
| 6,345,747 | B1 | * | 2/2002 | Ogata et al. .................... 224/257 |
| 6,571,434 | B2 | * | 6/2003 | Ortiz .............................. 24/615 |
| 7,181,809 | B1 | * | 2/2007 | Kuo .............................. 24/300 |
| 7,540,070 | B1 | * | 6/2009 | Selby ......................... 24/265 H |
| 7,805,816 | B1 | * | 10/2010 | Thorne et al. ................... 24/301 |
| 8,234,758 | B2 | * | 8/2012 | Liu ............................ 24/265 H |
| 8,366,058 | B2 | * | 2/2013 | Tiedemann, Sr. ............. 248/74.3 |
| 8,769,776 | B2 | * | 7/2014 | Raymond ....................... 24/130 |
| 2005/0050695 | A1 | * | 3/2005 | Mackey et al. ................. 24/300 |
| 2007/0056147 | A1 | * | 3/2007 | Tracy ......................... 24/265 H |
| 2009/0119891 | A1 | * | 5/2009 | Leung ........................ 24/68 CD |
| 2010/0024177 | A1 | * | 2/2010 | Hayes et al. ................. 24/588.1 |
| 2011/0005041 | A1 | * | 1/2011 | Gangakhedkar et al. ........ 24/302 |
| 2011/0030175 | A1 | * | 2/2011 | Tiedemann, Sr. .............. 24/306 |

\* cited by examiner

*Primary Examiner* — Robert J Sandy
*Assistant Examiner* — David Upchurch
(74) *Attorney, Agent, or Firm* — Cooper Legal Group, LLC

(57) ABSTRACT

A hook assembly includes at least one attachment structure having a hook portion extending from a body portion. The body portion includes a connection feature having at least one protrusion positioned adjacent at least one recess. The connection feature interlocks with a corresponding identical connection feature of a second attachment structure such that the attachment structure and second attachment structure are attached.

20 Claims, 8 Drawing Sheets

HOOK ASSEMBLY

BACKGROUND OF THE INVENTION

1. Field of the Invention

The present invention relates generally to a hook assembly and, in particular, to a hook assembly having attachment structures that are attachable to each other.

2. Discussion of the Prior Art

Hook assemblies are commonly used for attaching and securing various items together. In general, hook assemblies include a pair of attachment structures attached together by a strap, bungee cord, or the like. During the storage of these hook assemblies, such as before a sale has occurred, it is desirable to connect the attachment structures to each other so as to reduce the likelihood of inadvertent tangling, knotting, etc. of various hook assemblies. This tangling, knotting, etc. is more likely when a number of hook assemblies are stored together in a bin or container. In an effort to reduce tanging/knotting, a number of different connecting devices were used to attach the pair of attachment structures together, including rubber bands, plastic wrap, ropes, adhesives, etc. However, these connecting devices have a tendency to come undone, thus allowing for the attachment structures to become detached. Further, if the connecting devices became lost, a new connecting device would have to be obtained to reattach the attachment structures.

Accordingly, there is a need and it would be beneficial to provide the attachment structures of a hook assembly with a connection feature, such that the attachment structures can be selectively attached and detached without the need for separate connecting devices (wraps, ropes, adhesives, etc.).

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a hook assembly including at least one attachment structure having a hook portion extending from a body portion. The body portion includes a connection feature having at least one protrusion positioned adjacent at least one recess. The connection feature is configured to interlock with a corresponding identical connection feature of a second attachment structure such that the attachment structure and second attachment structure are attached.

In accordance with another aspect, the present invention provides a hook assembly including a first attachment structure including a hook portion extending from a body portion, the body portion including a first connection feature. A second attachment structure includes a second connection feature. The first connection feature is configured to interlock with the second connection feature such that the first attachment structure is configured to be attached to the second attachment structure in either a forward facing direction or a reverse facing direction.

In accordance with another aspect, the present invention provides a hook assembly including a first attachment structure including at least one connection feature. The at least one connection feature includes a protrusion positioned adjacent a recess. A second attachment structure is attached to the first attachment structure by a strap. The second attachment structure includes at least one connection feature identical to the connection feature of the first attachment structure. The connection features of each of the first attachment structure and second attachment structure are configured to interlock such that the protrusion of the first attachment structure is received within the recess of the second attachment structure. The first attachment structure is configured to be attached to the second attachment structure in either a forward facing direction or a reverse facing direction.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
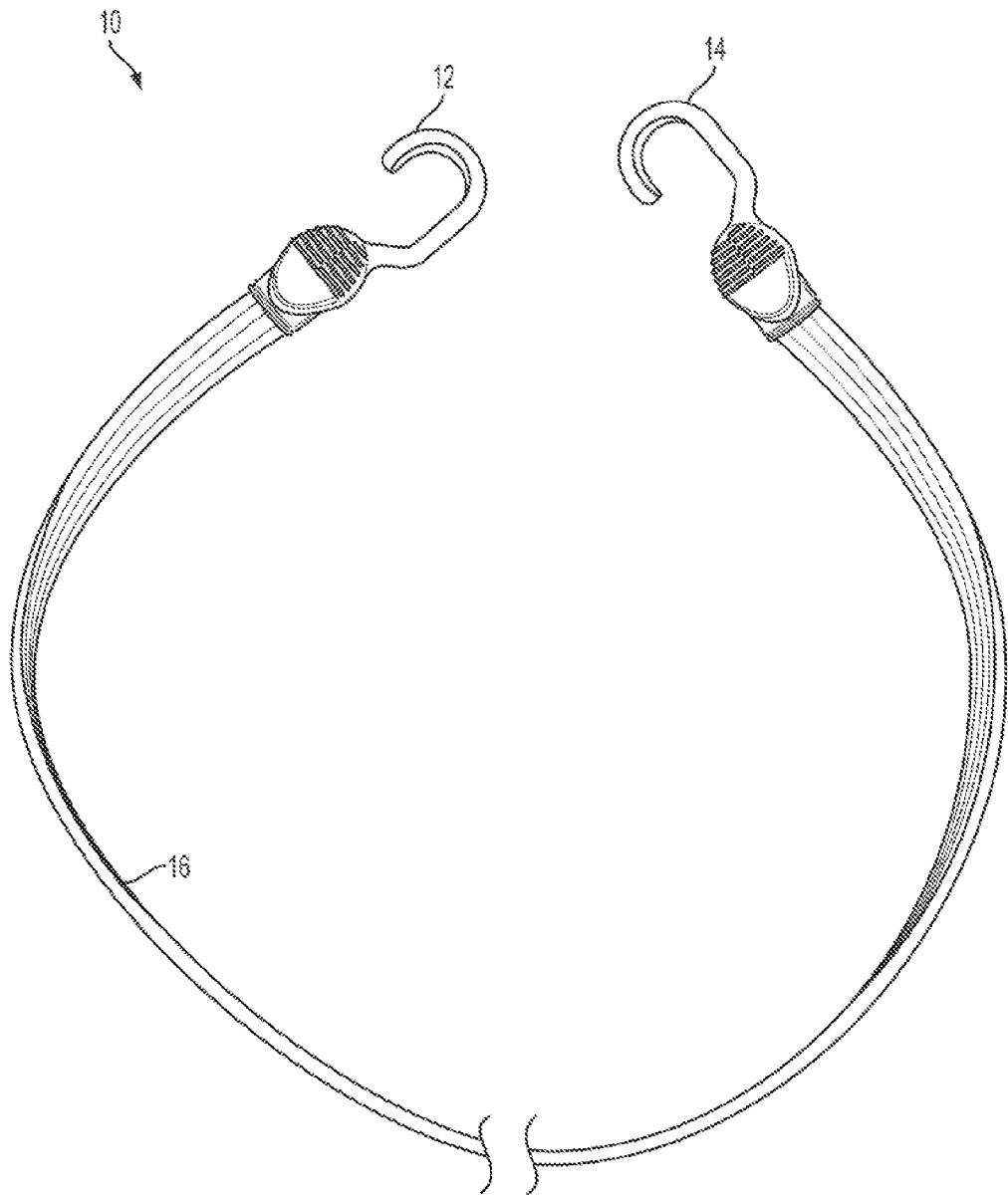
FIG. 1 is a perspective view of an example hook assembly including a pair of attachment structures connected by a strap in accordance with one aspect of the invention.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

FIG. 1 illustrates an example hook assembly 10 in accordance with one aspect of the invention. In short summary, the hook assembly 10 can be used for attaching and/or securing one or more objects together. In the illustrated example, the hook assembly 10 can be elongated, so as to attach objects together that can be located a distance apart.

The hook assembly 10 includes a first attachment structure 12 and a second attachment structure 14. In one example, the first attachment structure 12 and second attachment structure 14 can be generally identical in size, shape, and structure. The first attachment structure 12 and second attachment structure 14 can be attached/secured to any number of objects, structures, fixed structures, or the like.

The first attachment structure 12 and second attachment structure 14 are attached to each other by a strap 16. The strap 16 is an elongated member that can be attached at one end to the first attachment structure 12 and at an opposing second end to the second attachment structure 14. The strap 16 includes any number of sizes and shapes, as it is to be appreciated that the strap 16 in FIG. 1 includes only one example of the strap 16. For instance, in other examples, the strap 16 may be longer or shorter in length and/or may have a larger or smaller cross-sectional size. The strap 16 can include rounded cross-sectional shapes, flat cross-sectional shapes, etc. The strap 16 includes any number of different materials, including, but not limited to, ropes, nylon cables, metallic cables, elastomer-like rubber cables, bungee cables, etc. Likewise, the strap 16 may have some degree of flexibility or elasticity such that the strap 16 can be elongated, or, in other examples, can have a generally fixed, non-flexible length.

Figure 2:
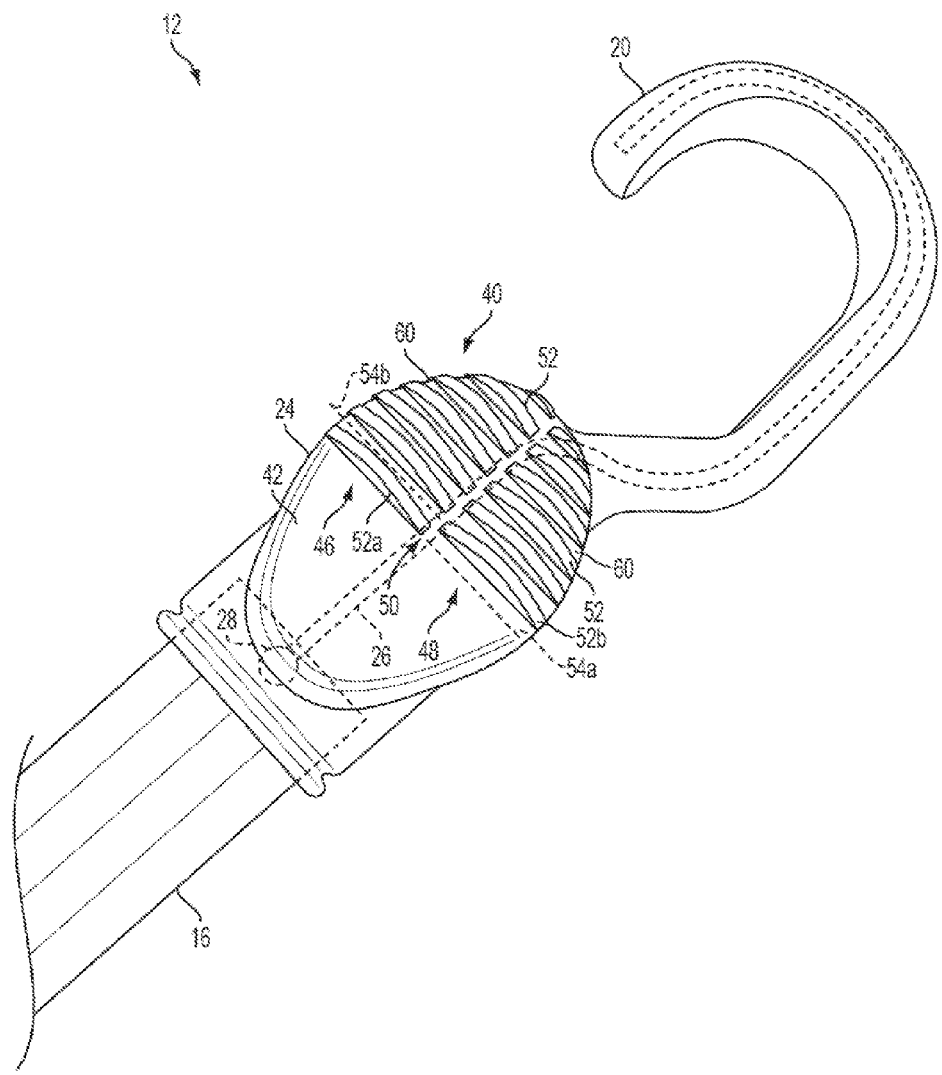
FIG. 2 is a perspective view of an example first attachment structure attached to the strap.

Turning now to FIG. 2, an example of the first attachment structure 12 is shown. It is to be appreciated that only the first attachment structure 12, and not the second attachment structure 14, is shown for ease of illustration. Indeed, in this example, the first attachment structure 12 and second attachment structure 14 are generally identical in size, shape, and structure. As such, the ensuing description of the first attachment structure 12 is generally identical to a description of the second attachment structure 14, and need not be repeated with respect to the second attachment structure 14.

The first attachment structure 12 includes a hook portion 20. The hook portion 20 is disposed at an end of the first attachment structure 12 opposite the attachment location of the first attachment structure 12 to the strap 16. In one example, the hook portion 20 defines a curved or bent structure that can catch/hold onto other objects. More particularly, in the shown example, the hook portion 20 can define a substantially straight portion extending along a linear axis with a bent, slightly rounded portion disposed at an end of the straight portion. Of course, it is to be understood that the hook portion 20 includes nearly any type of attachment assembly, and is not limited to the shown example. In another example, the hook portion 20 can have non-rounded bends, as opposed to the rounded, semi-circular bends shown. Further, the hook portion 20 could include a carabiner-type structure, having a rigid loop (e.g., metal, plastic, etc.) and a locking mechanism. Indeed, the hook portion 20 includes any number of materials, such as metals, plastics, elastomer-like materials, etc.

The first attachment structure 12 further includes a body portion 24 attached to and/or formed with the hook portion 20. The body portion 24 defines an elongated, bulbous structure that extends between the strap 16 at one end and the hook portion 20 at an opposing end. The body portion 24 can include a rounded or quadrilaterally shaped cross-section having one or more side walls. In this example, the body portion 24 has a rounded, oval shape, though other shapes are envisioned. Likewise, the body portion 24 includes any number of dimensions, such as by being longer or shorter in length, thicker or thinner in cross-sectional size, etc.

The body portion 24 can be attached to the strap 16 in any number of ways. In one example, the body portion 24 is attached to the strap 16 with a fastener 26. The fastener 26 is represented by dashed lines in FIG. 2 as the fastener 26 is normally not visible due to being located within the first attachment structure 12. In this example, one end of the fastener 26 can extend through an opening 28 in the strap 16 so as to attach to the strap 16. Of course, the fastener 26 is not limited to extending through the opening 28. In other examples, the fastener 26 can be crimped and/or compressed around a portion of the strap 16. The fastener 26 includes any number of materials, such as metals, plastics, or the like.

To provide further support to the first attachment structure 12, the fastener 26 can extend through the body portion 24 and hook portion 20. In such an example, the fastener 26 includes a relatively rigid, non-flexible material, such as metals or the like. In the illustrated example, the fastener 26 (represented by dashed lines) extends through the body portion 24 and through the hook portion 20 towards an end of the hook portion 20. In examples in which the first attachment structure 12 is made from a plastic material, the fastener 26 can be molded/bonded to the body portion 24 and hook portion 20. As such, the fastener 26 provides support to the first attachment structure 12 by limiting the likelihood of bending, material failure, or the like.

The first attachment structure 12 further includes a connection feature 40. The connection feature 40 in this example is disposed on a first side 42 of the body portion 24. Though not visible in this example, a second, identical connection feature 40 can be disposed on an opposing side of the body portion 24.

The connection feature 40 in this example includes a first connecting portion 46 and a second connecting portion 48. The first connecting portion 46 and second connecting portion 48 are separated from each other by a channel 50 extending therebetween. In other examples, however, the connection feature 40 may not include the channel 50. Rather, in such an example, the first connecting portion 46 and second connecting portion 48 may not be separated and, instead, are formed as a single connecting portion. The channel 50 can be wider or narrower in width than as shown. Further, the channel 50 may define a protrusion, bump, projection, or the like formed by the fastener 26 extending underneath the channel 50.

Each of the first connecting portion 46 and second connecting portion 48 includes a plurality of protrusions 52. The protrusions 52 extend generally parallel to each other across the first side 42 of the body portion 24. In this example, the protrusions 52 each extend in a direction that is generally transverse to a direction along which the channel 50 and fastener 26 extend. Of course, the protrusions 52 are not specifically limited to extending in this direction, and in other examples, could extend at an angle with respect to the channel 50 and fastener 26 or parallel to the channel 50 and fastener 26.

The protrusions 52 each define a raised projection extending outwardly from the first side 42 of the body portion 24. The protrusions 52 can include a larger or shorter height (i.e., distance from the first side 42 to an apex of the protrusions 52) than as shown in the example. The protrusions 52 can include a slightly rounded and/or ramped shape, such that the protrusions 52 have a gradually increasing height beginning from the edges of the body portion 24. In this example, the protrusions 52 may each have a differing length. For instance, the length of the protrusions 52 in proximity to the hook portion 20 have a shorter length than the protrusions 52 located at the center of the body portion 24 (e.g., a distance away from the hook portion 20). Indeed, in this example, the individual protrusions 52 have gradually increasing lengths along a direction away from the hook portion 20.

Each of the first connecting portion 46 and second connecting portion 48 have generally identical protrusions 52. However, in this example, the protrusions 52 in the first connecting portion 46 are offset from the protrusions 52 in the second connecting portion 48. For instance, a first protrusion 52a in the first connecting portion 46 extends along a first axis 54a. A second protrusion 52b in the second connecting portion 48 extends along a second axis 54b. In this example, the first axis 54a and second axis 54b are offset from and parallel to each other. The remaining protrusions 52 in the first connecting portion 46 can similarly be offset from the remaining protrusions 52 in the second connecting portion 48.

Each of the first connecting portion 46 and second connecting portion 48 includes a plurality of recesses 60. The recesses 60 are positioned between neighboring protrusions 52 such that the recesses 60 extend in a substantially parallel direction with the protrusions 52. In this example, the recesses 60 each extend in a direction that is generally transverse to a direction along which the channel 50 and fastener 26 extend. The recesses 60 can define an inward indentation, dent, gap, or the like that projects inwardly into the body portion 24.

In one example, the recesses 60 each define a space that is sized and shaped to match a size and shape of the protrusions 52. Along these lines, each of the recesses 60 is sized and shaped to receive a corresponding protrusion 52 in a mating relationship. As such, the protrusions 52 can be inserted into the recesses 60. Due to the substantially matching size/shape of the recesses 60 and protrusions 52, the protrusions 52 are somewhat limited in moving with respect to the recesses 60.

Figure 3:
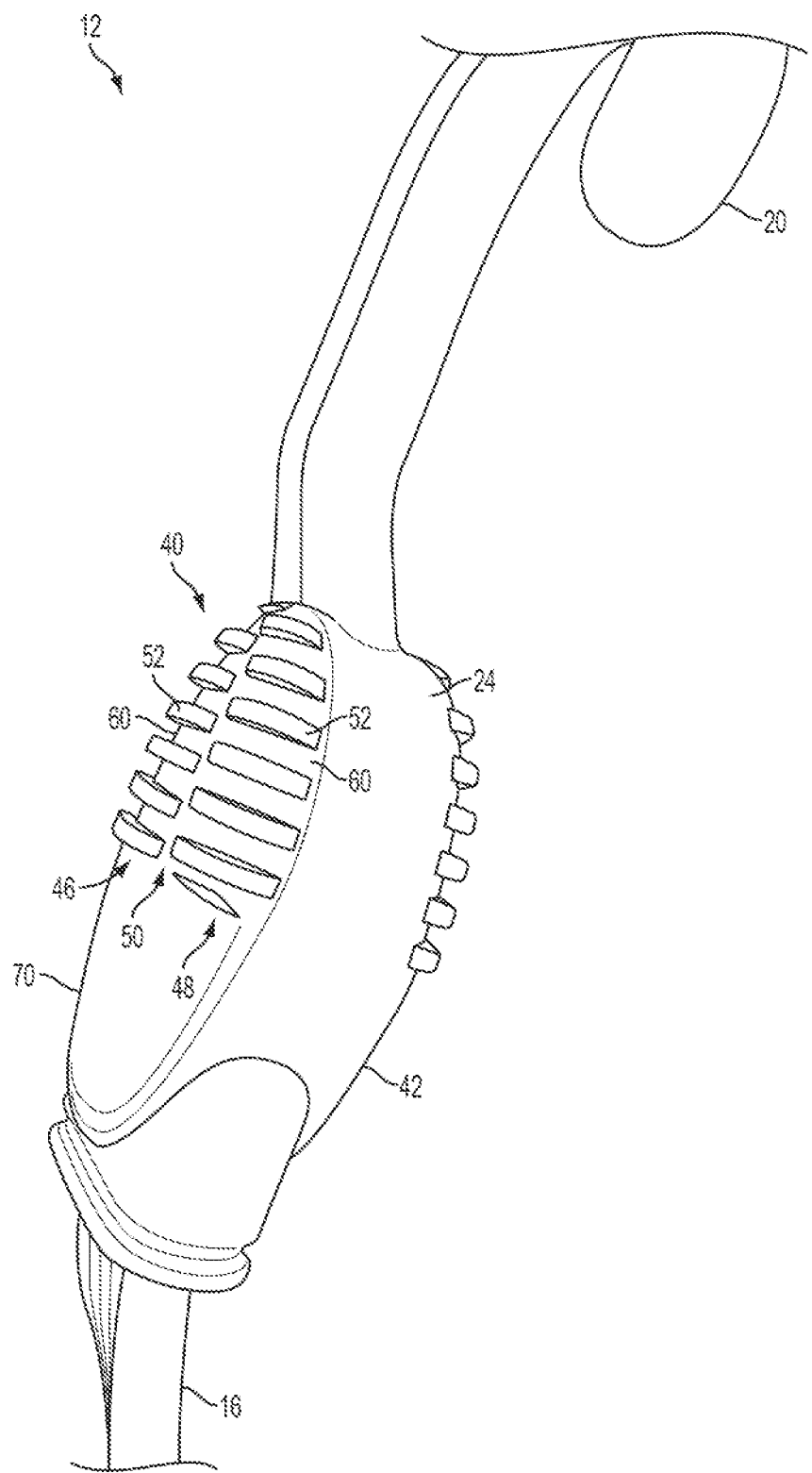
FIG. 3 is a perspective view of a first side and a second side of the first attachment structure.

Turning now to FIG. 3, a second side 70 of the body portion 24 is shown. The second side 70 is disposed opposite the first side 42 of the body portion 24. In this example, the second side 70 is generally identical in size, shape, and structure as the first side 42. For instance, the second side 70 includes the first connecting portion 46 and second connecting portion 48 separated by the channel 50. Likewise, the second side 70 includes the protrusions 52 separated from each other by the recesses 60. As with the first side 42, the protrusions 52 in the first connecting portion 46 are offset from the protrusions 52 in the second connecting portion 48. Accordingly, since the structure of the second side 70 is generally identically to that of the first side 42, the aforementioned features need not be discussed in detail again.

Figure 4:
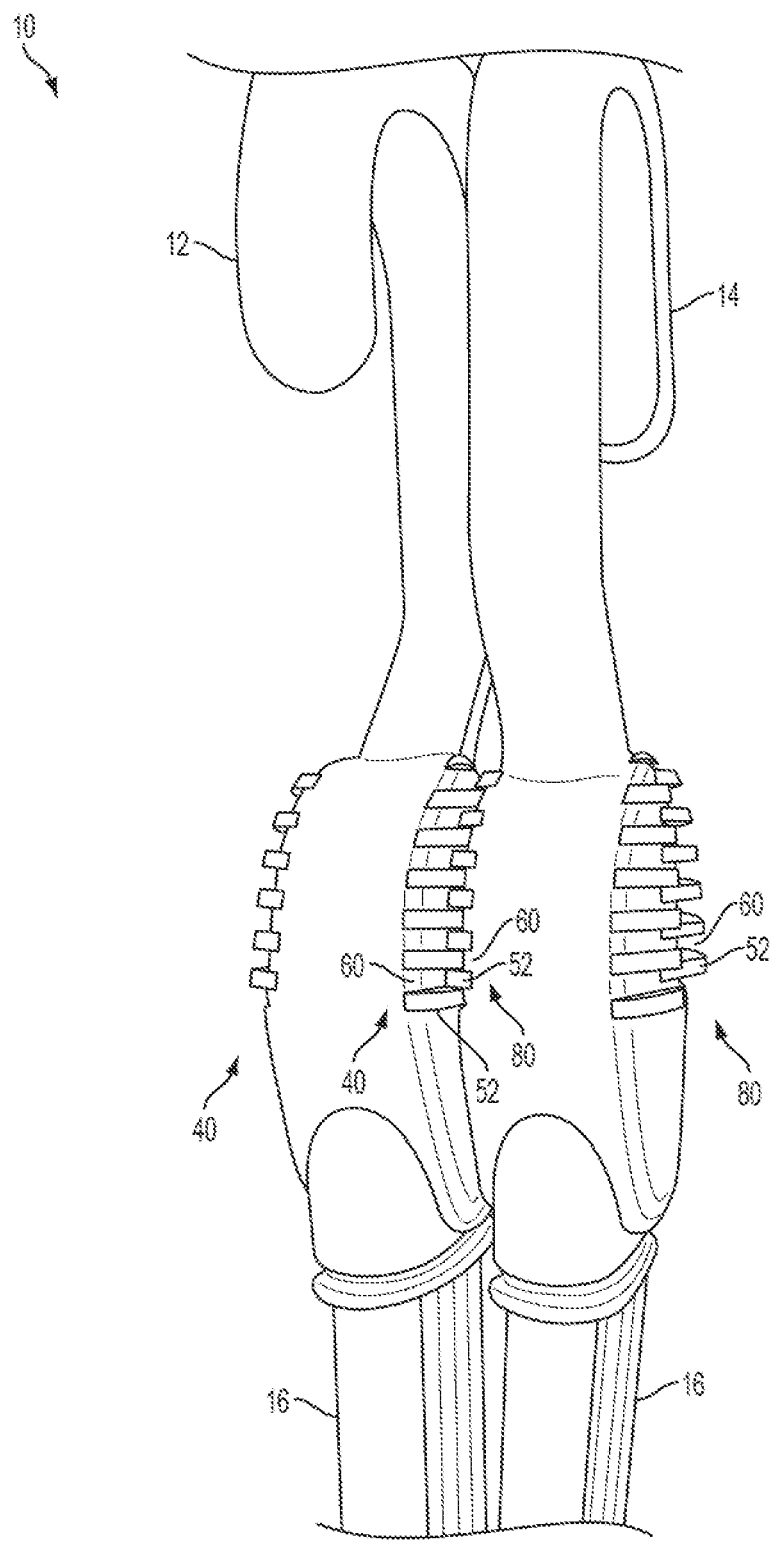
FIG. 4 is a perspective view of the first attachment structure attached to a second attachment structure in a reverse facing direction with connection features of the first and second attachment structures interlocking.

Turning now to FIG. 4, the first attachment structure 12 can be attached to the second attachment structure 14 in a reverse facing direction. In this example, the hook portions 20 of each of the first attachment structure 12 and second attachment structure 14 are positioned to extend in opposing directions. As will be explained with respect to FIG. 5, the first attachment structure 12 could instead be attached with the second attachment structure 14 in a forward facing direction, in which the hook portions 20 are positioned to extend in the same direction.

Referring still to FIG. 4, the second attachment structure 14 includes one or more second connection features 80. In this example, the second attachment structure 14 includes second connection features 80 disposed on opposing sides of the second attachment structure 14. The second connection feature 80 is identical in size, shape, and structure as the connection feature 40 described above with respect to FIG. 2. Indeed, the second connection feature 80 includes protrusions 52, recesses 60, etc. As such, the second connection feature 80 need not be described in detail again.

As shown in FIG. 4, the connection feature 40 of the first attachment structure 12 can be attached to the second connection feature 80 of the second attachment structure 14. In particular, the protrusions 52 of the first attachment structure 12 are received within the recesses 60 of the second attachment structure 14. Likewise, the protrusions 52 of the second attachment structure 14 are received within the recesses 60 of the first attachment structure 12. Due to the substantially matching size/shapes of the recesses 60 and protrusions 52, the protrusions 52 are limited in moving with respect to the recesses 60. Indeed, the protrusions 52, when positioned within the recesses 60, are each bound by neighboring protrusions 52 from the other attachment structure.

Figure 5:
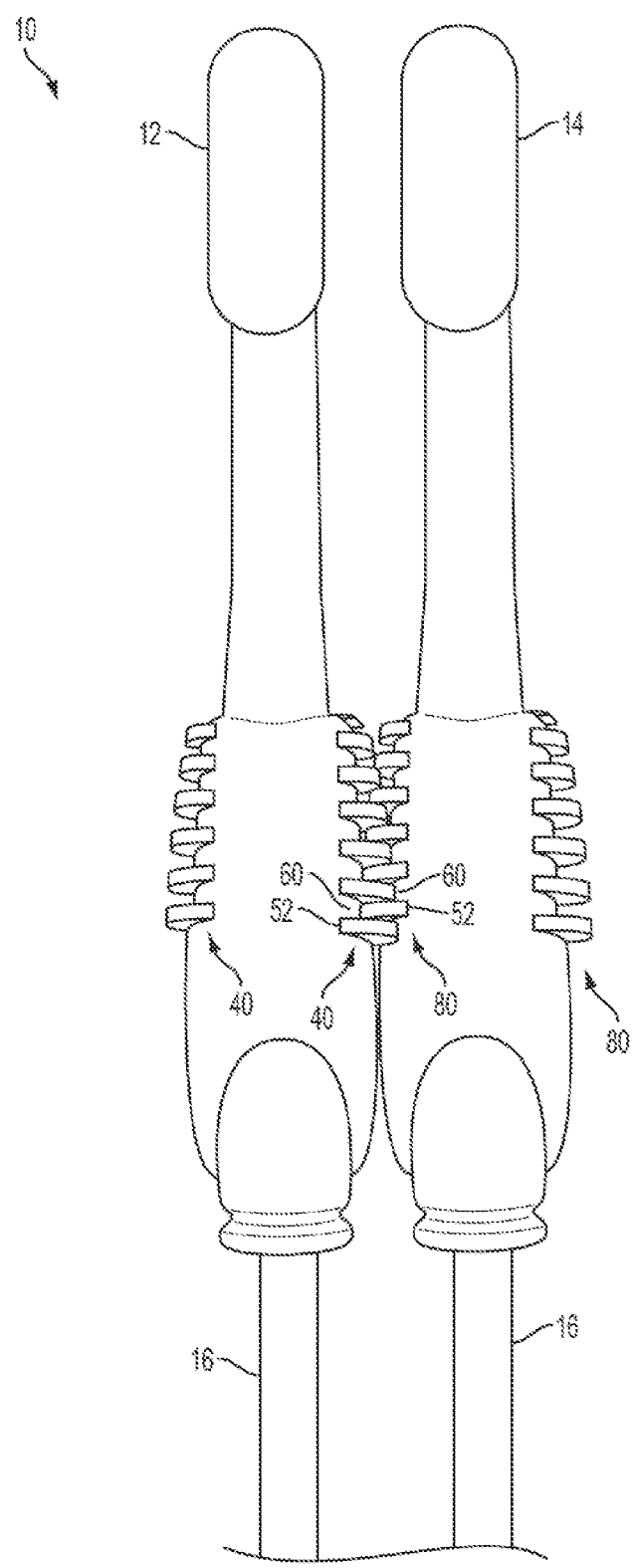
FIG. 5 is a perspective view of the first attachment structure attached to the second attachment structure in a forward facing direction with the connection features interlocking.

Turning now to FIG. 5, the first attachment structure 12 is shown in attachment with the second attachment structure 14 in the forward facing direction. Similar to the example of FIG. 4, the connection feature 40 of the first attachment structure 12 can be attached to the second connection feature 80 of the second attachment structure 14. For instance, the protrusions 52 of the first attachment structure 12 are received within the recesses 60 of the second attachment structure 14. Likewise, the protrusions 52 of the second attachment structure 14 can be received within the recesses 60 of the first attachment structure 12. Again, due to the substantially matching sizes/shapes of the recesses and protrusions 52, the protrusions 52 are limited from moving and/or from becoming disengaged from the recesses 60 while in the forward facing direction.

The first attachment structure 12 can therefore be attached to the second attachment structure 14 in either of the forward facing or reverse facing directions. By providing for this attachment, additional connecting devices are no longer needed. For instance, plastic wrap, rubber bands, adhesives, or the like are no longer necessary to attach the first attachment structure 12 to the second attachment structure 14. Further, attachment of the first attachment structure 12 to the second attachment structure 14 will limit inadvertent tangling, knotting, etc. of the various hook assemblies 10 when placed together, such as in a bin or container.

Figure 6:
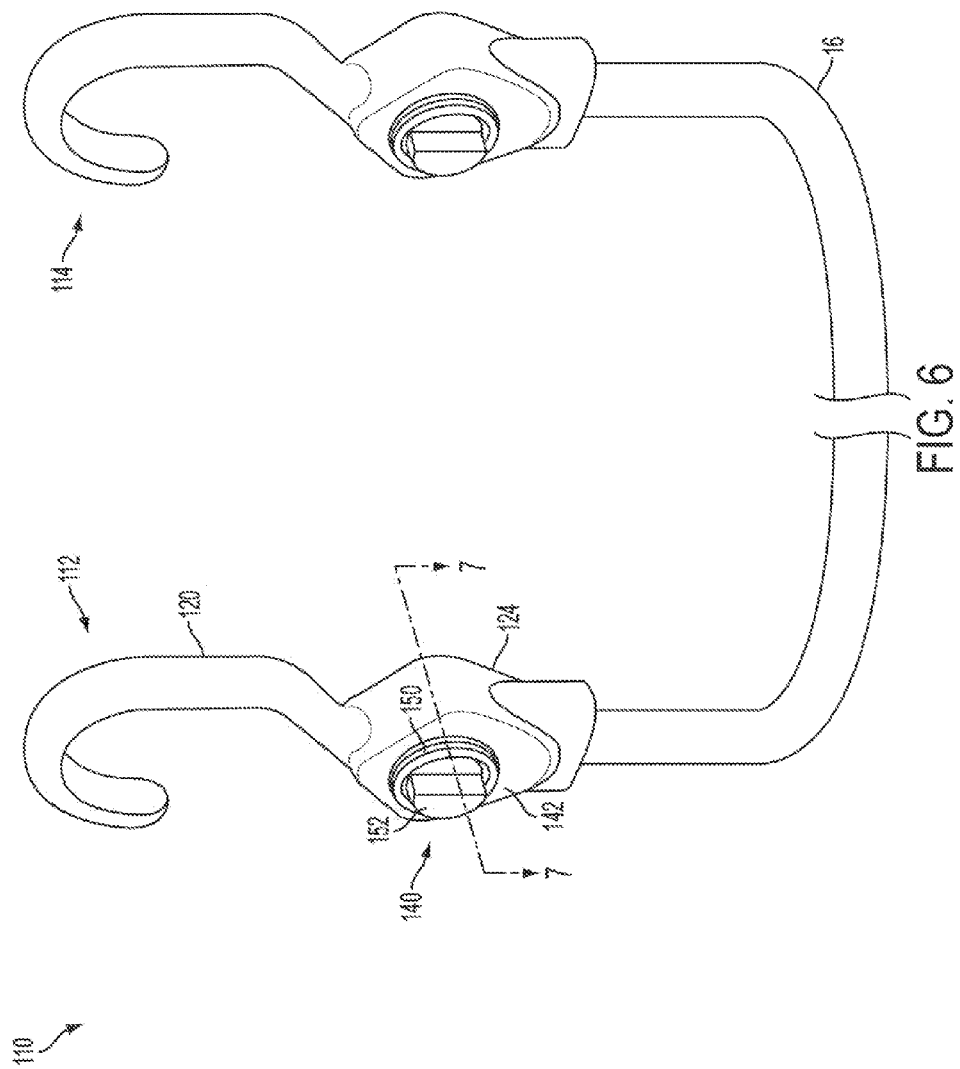
FIG. 6 is a perspective view of a second example hook assembly including a pair of attachment structures connected by the strap.

Turning now to FIG. 6, a second example hook assembly 110 is shown. The second hook assembly 110 includes a first attachment structure 112 and a second attachment structure 114 attached together by the strap 16. The strap 16 is generally identical to the strap 16 described above with respect to the hook assembly 10, and need not be described in detail again. Further, in this example, the first attachment structure 112 and second attachment structure 114 are generally identical in size, shape, and structure. As such, the ensuing description of the first attachment structure 112 is generally identical to a description of the second attachment structure 114, and need not be repeated with respect to the second attachment structure 114.

The first attachment structure 112 includes a hook portion 120. The hook portion 120 is generally identical to the hook portion 20 described above with respect to FIG. 2. Indeed, the hook portion 120 defines a curved or bent structure that can catch/hold onto other objects. As such, the hook portion 120 need not be described in detail again.

The first attachment structure 112 further includes a body portion 124 attached/formed with the hook portion 120. The body portion 124 is an elongated, bulbous structure extending between the strap 16 at one end and the hook portion 120 at an opposing end. In this example, the body portion 124 has a generally quadrilaterally shaped cross-section. Of course, as set forth above, the body portion 124 includes any number of sizes, shapes, and could include the rounded, oval shape of FIG. 2, or other, unshown shapes.

The body portion 124 can be attached to the strap 16 in any number of ways. In one example, the body portion 124 is attached to the strap 16 in an identical manner as the body portion 24 of FIG. 2. In such an example, the fastener 26 (not shown in FIG. 7) can extend through the first attachment structure 112 and through an opening in the strap 16. The body portion 124 is not so limited to this means of attachment. Rather, the body portion 124 could instead be molded around the strap 16. In any of these examples, the body portion 124 could include a generally flat opening (as shown) for the strap 16, a circular opening, or the like.

The first attachment structure 112 further includes a connection feature 140. The connection feature 140 in this example is disposed on a first side 142 of the body portion 124. Though not visible in this example, a second, identical connection feature 140 is disposed on an opposing side of the body portion 124. The connection feature 140 allows for mating/engagement between the first attachment structure 112 and the second attachment structure 114.

The connection feature 140 includes a mating ledge 150. In one example, the mating ledge 150 extends outwardly from the side wall 142 and includes a generally circular shape. Of course, the mating ledge 150 could include other shapes, and is not limited to the circular shape shown in FIG. 7. Instead, the mating ledge 150 could include a quadrilateral shape, such as a square, rectangle, or the like, or a rounded oval shape. The mating ledge 150 can define a raised projection extending outwardly from the side wall 142 of the body portion 124. The mating ledge 150 can extend a larger or smaller distance than in the shown example, such that the mating ledge 150 can include a taller or shorter raised projection. Similarly, the mating ledge 150 could further include a wider or narrower cross-sectional width. Accordingly, the mating ledge 150 shown in FIG. 6 includes merely one possible example of the mating ledge 150, as a number of sized and shaped mating ledges are envisioned.

The connection feature 140 includes a protrusion 152. The protrusion 152 can be positioned within the mating ledge 150 and, in the illustrated example, within an inner circumference of the mating ledge 150. The protrusion 152 defines a raised projection extending outwardly from the side wall 142 of the body portion 124. The protrusion 152 can include a larger height (i.e., distance from the side wall 142 to an apex of the protrusion 152) than a height of the mating ledge 150. As such, the protrusion 152 can project outwardly from the side wall 142 a greater distance than the mating ledge 150. It is to be appreciated, however, that the protrusion 152 could extend a larger or smaller distance from the side wall 142 than in the shown example. The protrusion 152 can include a generally half-circle shape, though a number of sizes and shapes are envisioned. For instance, the protrusion 152 could further include less than or greater than a half-circle shape, such as a quarter-circle shape, or a ¾ circle shape. Even further, the protrusion 152 could include a quadrilateral shape, such as a rectangle or a square. As such, it is to be appreciated that the protrusion 152 could include a number of different sizes and shapes, and is not limited to the shown examples.

Figure 7:
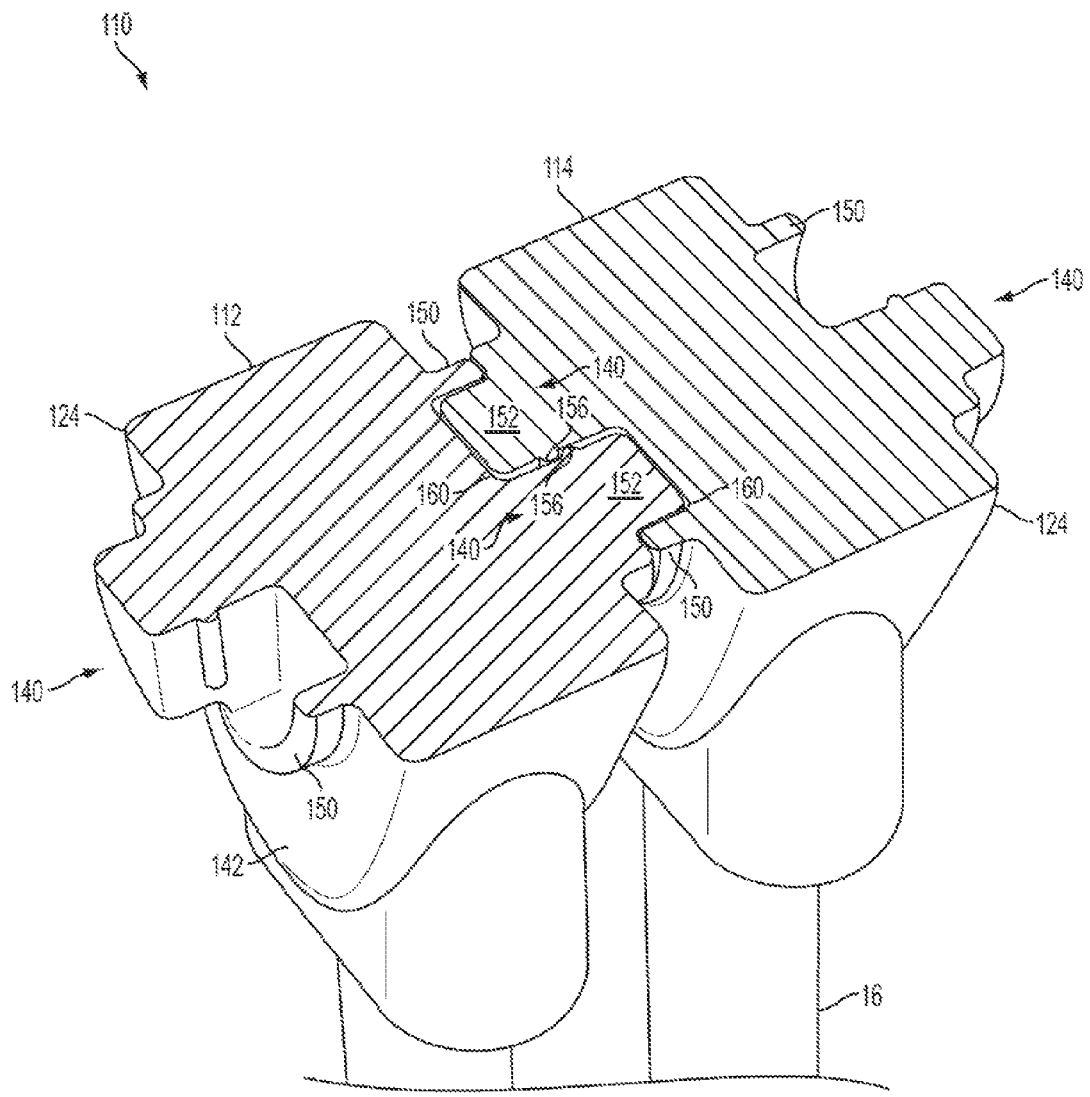
FIG. 7 is a sectional view long line 7-7 of FIG. 6 depicting attachment structures of the second hook assembly attached together.

Turning now to FIG. 7, a sectional view along lines 7-7 of FIG. 6 is shown. It is to be appreciated that FIG. 7 depicts the first attachment structure 112 and second attachment structure 114 in a mated/engaged positioned. Indeed, the connection feature 140 of the first attachment structure 112 will mate/engage with the connection feature 140 of the second attachment structure 114.

The protrusion 152 further includes an outward projection 156. The outward projection 156 is positioned on an inner wall of the protrusion 152, and extends radially outwardly from the inner wall of the protrusion 152. The outward projection 156 can extend longitudinally along the length of the protrusion 152 between opposing sides of the mating ledge 150, but may terminate prior to reaching the mating ledge 150. In one example, the outward projection 156 is positioned at approximately about a midpoint height of the protrusion 152. Of course, it is to be understood that the outward projection 156 can include a number of sizes, shapes, and orientations, and is not limited to the examples shown.

The connection feature 140 can further include a recess 160. The recess 160 is positioned within an inner circumference of the mating ledge 150. The recess 160 can define an inward indentation, dent, or the like that projects inwardly into the body portion 124 from the side wall 142. More specifically, the recess 160 can project radially inwardly from the mating ledge 150 and into the side wall 142. It is to be appreciated, however, that the recess 160 can project inwardly into the side wall 142 a larger or smaller distance than in the shown example. The recess 160 can include a generally half-circle shape, such that the recess 160 comprises the remainder of the interior of the mating ledge 150 not including the protrusion 152. Accordingly, in the shown example, the recess 160 defines a space that is sized and shaped to match the size and shape of the protrusion 152. Along these lines, the recess 160 is sized and shaped to receive the protrusion 152 in a mating relationship, such that the protrusion 152 can be inserted into the recess 160. Due to the matching size/shape of the recess 160 and protrusion 152, the protrusion 152 is relatively limited in moving with respect to the recess 160, as the protrusion 152 is bounded by the mating ledge 150 and a corresponding protrusion 152.

As shown in FIG. 7, the first attachment structure 112 and second attachment structure 114 can be attached to each other. In one example, the first attachment structure 112 is positioned adjacent the second attachment structure 114. The first attachment structure 112 is moved laterally towards the second attachment structure 114. As the first attachment structure 112 moves closer to the second attachment structure 114, the protrusion 152 of the first attachment structure 112 is inserted into the recess 160 of the second attachment structure 114. Similarly, the protrusion 152 of the second attachment structure 114 is inserted into the recess 160 of the first attachment structure 112. The first attachment structure 112 and second attachment structure 114 are further moved towards each other until the mating ledge 150 of the first attachment structure 112 contacts and engages the mating ledge 150 of the second attachment structure 114. Similarly, each of the protrusions 152 can reach a maximum inserted distance by abutting the recesses 160.

To further assist in limiting the attachment structures from inadvertently being removed from each other, the outward projection 156 of the first attachment structure 112 can engage and mate with the outward projection 156 of the second attachment structure 114. More specifically, the outward projections 156 can be positioned in a side-by-side relationship, with each outward projection 156 extending outwardly and contacting either or both of the protrusion 152 or outward projection 156. Accordingly, the first attachment structure 112 and second attachment structure 114 are limited from inadvertently detaching from each other. Due to the orientation of the connection feature 140, the first attachment structure 112 and second attachment structure 114 can be attached to each other in either a forward facing direction or a reverse facing direction.

Figure 8:
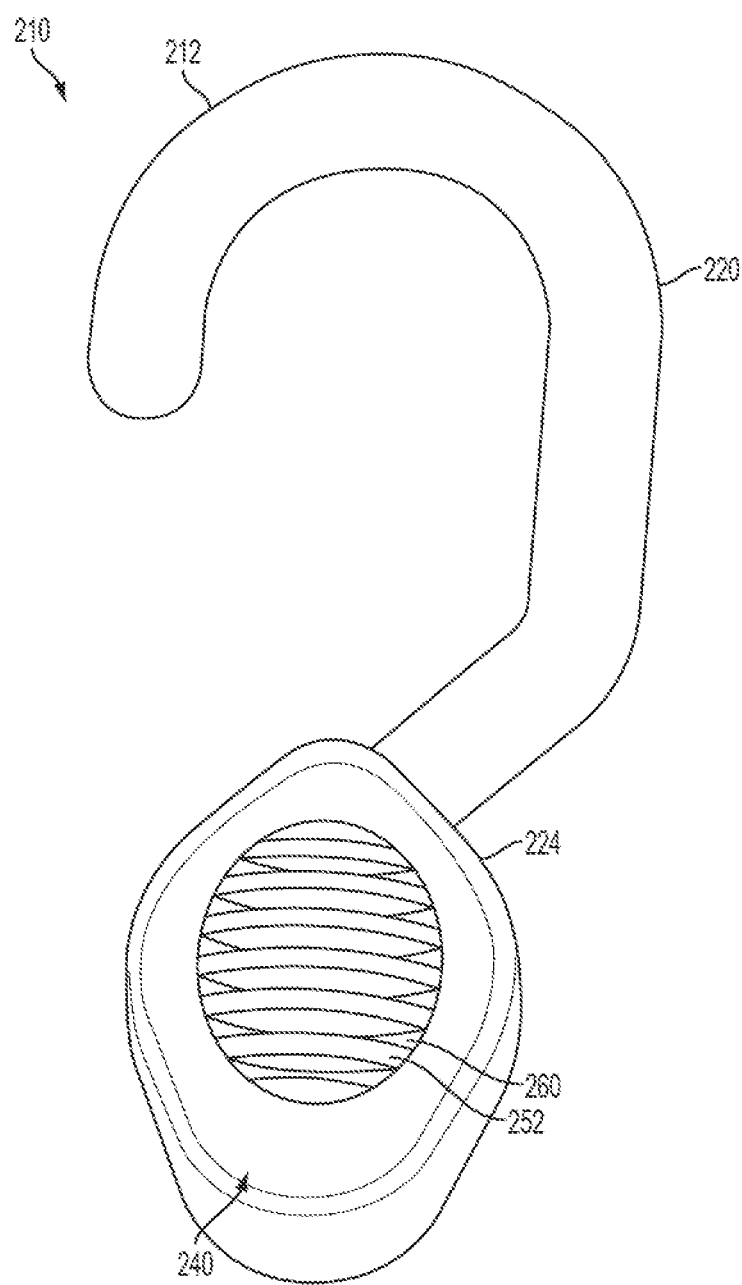
FIG. 8 is a perspective view of an attachment structure of a third example hook assembly.

Turning now to FIG. 8, a third example hook assembly 210 is shown. The third hook assembly 210 includes an attachment structure 212. Though not shown in this example, the attachment structure 212 can be attached to a second attachment structure in any number of ways. For instance, similar to the examples shown in FIGS. 1 to 7, the attachment structure 212 can be attached by means of the strap 16 to a second attachment structure (not shown). The strap 16 may be generally identical in size, shape, and structure as described above, and need not be explained in detail again.

As with the previous examples, the attachment structure 212 in this example includes a hook portion 220 attached to a body portion 224. The hook portion 220 is generally identical in structure to the hook portion 20, 120 described above.

Likewise, the body portion 224 is also generally identical in structure to the body portion 24, 124 described above and can be attached to the strap 16 in a similar manner. As such, the hook portion 220 and body portion 224 need not be described in detail again.

The attachment structure 212 further includes a connection feature 240. The connection feature 240 in this example is disposed on a first side of the body portion 224. Though not visible in this example, a second, identical connection feature 240 is disposed on an opposing side of the body portion 224. The connection feature 240 allows for mating/engagement between the attachment structures.

The connection feature 240 includes a plurality of protrusions 252. The protrusions 252 extend generally parallel to each other across the first side of the body portion 224. The protrusions 252 are not specifically limited to extending in this direction, and in other examples, could extend at various angles along the first side of the body portion 224. The protrusions 252 each define a raised projection extending outwardly from the first side of the body portion 224. The protrusions 252 can include a larger or shorter height (i.e., distance from the first side to an apex of the protrusions 252) than as shown in the example. The protrusions 252 can include a slightly rounded and/or ramped shape, such that the protrusions 252 have a gradually increasing height beginning from the edges of the body portion 24.

The connection feature 240 includes a plurality of recesses 260. The recesses 260 are positioned between neighboring protrusions 252 such that the recesses 260 extend in a substantially parallel direction with the protrusions 252. The recesses 260 can define an inward indentation, dent, or the like that projects inwardly into the body portion 224. In one example, the recesses 260 each define a space that is sized and shaped to match a size and shape of the protrusions 252. Along these lines, each of the recesses 260 is sized and shaped to receive a corresponding protrusion 252 in a mating relationship. As such, the protrusions 252 can be inserted into the recesses 260. Due to the substantially matching size/shape of the recesses 260 and protrusions 252, the protrusions 252 are somewhat limited in moving with respect to the recesses 260.

In operation, the connection features 240 of separate attachment structures 212 can be attached to each other in a mating/interlocking relationship. For instance, the protrusions 252 of one of the attachment structures 212 can be inserted into the recesses 260 of another attachment structure 212. Due to the substantially matching size/shapes of the recesses 260 and protrusions 252, the protrusions 252 are limited in moving with respect to the recesses 260. Accordingly, the attachment structures 212 can be attached in either of the forward facing direction or the reverse facing direction.

Due to the presence of the connecting features 40, 140, 240, the first attachment structure 12, 112, 212 and second attachment structure 14, 114 can be attached together. This attachment ensures that separate, auxiliary connecting devices are no longer needed. In particular, plastic wraps, rubber bands, adhesives, or the like are no longer needed to secure the attachment structures together. This attachment will further reduce the likelihood of tangling, knotting, etc. of the straps 16 of separate hook assemblies 10, 110, 210. Accordingly, the hook assemblies 10, 110, 210 can be more easily stored, such as in a bin/container, on a display shelf, etc.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A hook assembly including:
at least one attachment structure having a hook portion extending from a body portion, the body portion including a connection feature, separate from the hook portion, having at least one protrusion positioned adjacent at least one recess, the connection feature being configured to interlock with a corresponding identical connection feature of a second attachment structure such that the attachment structure and second attachment structure are attached together by just the two identical connection features and without engagement of the hook portions of the attachment structure and second attachment structure.

2. The hook assembly of claim 1, wherein the connection feature includes a first connecting portion, separate from the hook portion, and a second connecting portion, separate from the hook portion, separated from each other by a channel.

3. The hook assembly of claim 2, wherein each of the first connecting portion and the second connecting portion includes a plurality of protrusions positioned adjacent a plurality of recesses located on a side of the body portion located away from the hook portion.

4. The hook assembly of claim 3, wherein the protrusions in the first connecting portion are offset from the protrusions in the second connecting portion.

5. The hook assembly of claim 4, wherein the attachment structures are configured to be attached in a forward facing direction.

6. The hook assembly of claim 4, wherein the attachment structures are configured to be attached in a reverse facing direction.

7. The hook assembly of claim 1, further including a fastener extending within the at least one attachment structure.

8. The hook assembly of claim 7, wherein the fastener is attached at one end to a strap that extends into the body portion of the at least one attachment structure.

9. The hook assembly of claim 8, wherein the fastener extends through the body portion and through the hook portion.

10. The hook assembly of claim 1, wherein the connection feature includes a pair of connection features disposed on a first side and an opposing second side of the body portion.

11. A hook assembly including:
a first attachment structure including a hook portion extending from a body portion, the body portion including a first connection feature, separate from the hook portion; and
a second attachment structure including a second connection feature, separate from the hook portion, wherein the first connection feature is configured to interlock with the second connection feature such that the first attachment structure is configured to be attached to the second attachment structure in either a forward facing direction or a reverse facing direction, and be attached together by just the first and second connection features and without engagement of the hook portions of the first and second attachment structures.

12. The hook assembly of claim 11, wherein the first connection feature and second connection feature each include a first connecting portion, separate from the hook portion, and a second connecting portion, separate from the hook portion, separated from each other by a channel.

13. The hook assembly of claim 12, wherein each of the first connecting portion and the second connecting portion includes a plurality of protrusions positioned adjacent a plurality of recesses located on a side of the body portion located away from the hook portion.

14. The hook assembly of claim 13, wherein the protrusions in the first connecting portion are offset from the protrusions in the second connecting portion to facilitate attachment of the first attachment structure to the second attachment structure in either the forward facing direction or reverse facing direction.

15. The hook assembly of claim 11, further including a fastener extending within each of the first attachment structure and the second attachment structure.

16. The hook assembly of claim 15, wherein the fastener in each of the first attachment structure and second attachment structure is attached at one end of the respective fastener to a strap that extends between the first attachment structure and the second attachment structure.

17. A hook assembly including:
   a hook portion;
   a first attachment structure including a hook portion extending from a body portion, the body portion including at least one connection feature, separate from the hook portion, the at least one connection feature including a protrusion positioned adjacent a recess; and
   a second attachment structure attached to the first attachment structure by a strap, the second attachment structure including at least one connection feature identical to the connection feature of the first attachment structure, the connection features of each of the first attachment structure and second attachment structure being configured to interlock such that the protrusion of the first attachment structure is received within the recess of the second attachment structure, wherein the first attachment structure is configured to be attached to the second attachment structure in either a forward facing direction or a reverse facing direction, and be attached together by just the first and second connection features and without engagement of the hook portions of the first and second attachment structures.

18. The hook assembly of claim 17, wherein the at least one connection feature includes a first connecting portion, separate from the hook portion, and a second connecting portion, separate from the hook portion, separated from each other by a channel.

19. The hook assembly of claim 17, further including a fastener extending within each of the first attachment structure and the second attachment structure.

20. The hook assembly of claim 19, wherein the fastener in each of the first attachment structure and second attachment structure is attached at one end of the respective fastener to the strap that extends between the first attachment structure and the second attachment structure.

* * * * *

UNITED STATES PATENT AND TRADEMARK OFFICE
CERTIFICATE OF CORRECTION

PATENT NO. : 9,051,960 B2
APPLICATION NO. : 13/833846
DATED : June 9, 2015
INVENTOR(S) : Winston Breeden et al.

Page 1 of 1

It is certified that error appears in the above-identified patent and that said Letters Patent is hereby corrected as shown below:

Title Page, in item (73) titled Assignee: please delete "Winston Products LLC" and insert therefor --SmartStraps LLC--

Signed and Sealed this
Twenty-sixth Day of July, 2016

Michelle K. Lee
*Director of the United States Patent and Trademark Office*